Oct. 11, 1966 SHIGETADA FUKUOKA 3,277,803
AUTOMATIC EXPOSURE ADJUSTING DEVICE FOR CINE CAMERAS
Filed March 4, 1964
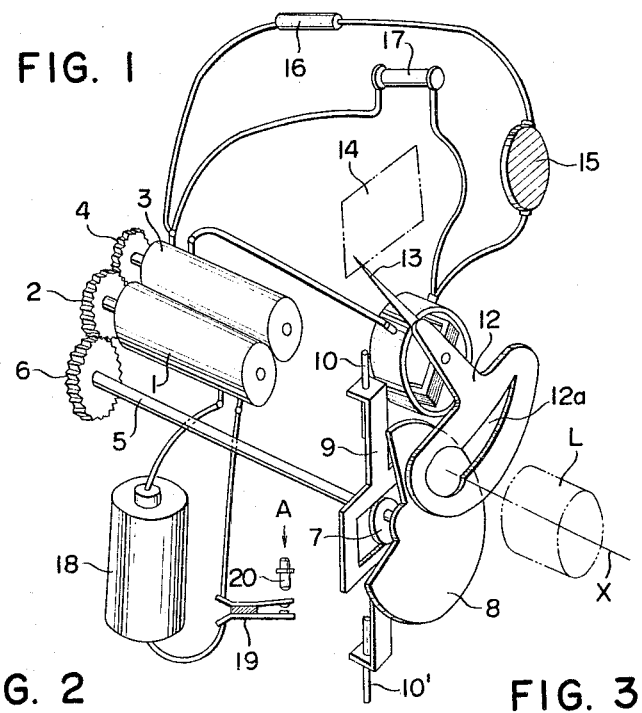
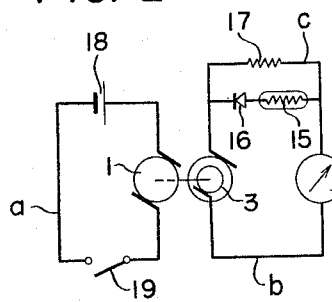
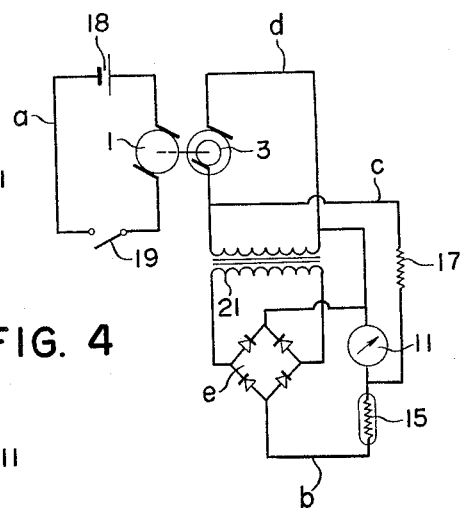
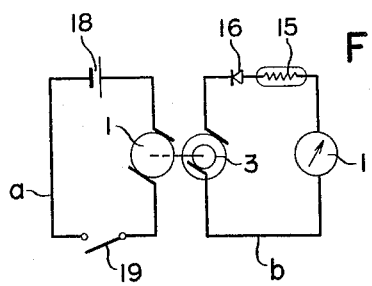
INVENTOR.
SHIGETADA FUKUOKA
BY
ATTORNEY

United States Patent Office 3,277,803
Patented Oct. 11, 1966

3,277,803
AUTOMATIC EXPOSURE ADJUSTING DEVICE
FOR CINE CAMERAS
Shigetada Fukuoka, Tokyo, Japan, assignor to Nippon Kogaku K.K., Tokyo, Japan, a corporation of Japan
Filed Mar. 4, 1964, Ser. No. 349,360
Claims priority, application Japan, Oct. 25, 1963, 38/56,282
5 Claims. (Cl. 95—10)

In general, miniature meters activated by feeble power have the common defect that regular operation of the meters is apt to be interrupted by undue movement of the pointer because of mechanical frictional resistances inherent in the meters. Quite likely, in automatic exposure adjusting devices in cine cameras, which use a galvanometer activated by direct current, mechanical friction at the pointer and the stop points of the exposure blades inherently exists as static friction which increases the resistance especially at the initial portion of movement thereof. Consequently, in such cases when the current value is decreased in accordance with the increment in the light resistance of the photoconductive body, smooth actuation of the galvanometer becomes difficult, thereby preventing good photography. For eliminating these defects, it is necessary either to reduce the mechanical static friction to as small a value as possible or to enlarge the activating power. However, it is technically difficult to achieve the former, and in the latter there is the problem of how to include such larger power source which requires considerable space in the camera.

The principal object of this invention is to delete these defects and to smoothly activate the automatic exposure adjusting device in any and all circumstances.

The principal feature of this invention is to provide an alternating current generator interconnected to the prime mover driving the shutter mechanism and the film transport mechanism, a portion of the alternating current produced by the generator being rectified to actuate the galvanometer and the residue of the A.C. being impressed on the galvanometer to apply a vibrating torque to the latter.

The invention will be more clearly understood by the following description in conjunction with the attached drawing in which:

FIG. 1 is a schematic drawing showing one illustrative embodiment according to the invention;

FIG. 2 is a drawing showing the circuitry employed in said embodiment;

FIG. 3 is a drawing showing the circuitry in case of full-wave rectification; and FIG. 4 is a drawing showing the circuitry to provide pulsation produced from a half-wave rectifier instead of overlapping an alternating current.

Now referring to FIG. 1, 1 is constant speed rotatable motor which is the prime mover for driving the shutter and transporting film, 2 being a gear fixed to the rotatable shaft of motor 1, 3 is an A.C. generator which is the electric source for the automatic exposure adjusting device hereinafter explained, 4 is a gear affixed to the rotatable shaft of generator 3, with 5 a shutter driving shaft rotatably mounted on the camera body (not shown). Gear 6 is affixed to the left end portion of shutter driving shaft 5, with 7 an eccentric cam affixed to the vicinity of the right end portion of shaft 5, rotatable shutter 8 is affixed to the right end portion of shaft 5. 9 is a film transporting element slidably supported by guide pins 10 and 10'. Element 9 is slidably shiftable in reciprocatory motion vertically by cam 7, such shift transporting and feeding film in the mechanism. 11 is a galvanometer, 12 is an exposure blade affixed to the rotating shaft of galvanometer 11, exposure aperture 12a being provided at the center portion of blade 12, 13 is a pointer formed as to rotate integrally with exposure blade 12, the head portion of pointer 13 being observable within finder 14, 15 is a photoelectric resistor, 16 a diode, 17 a resistor, 18 a battery, 19 a switch and 20 a release button to open or close switch 19. Above mentioned elements 1, 3, 11 and 15 to 19 are connected as shown in FIG. 2 and constitute the motor circuit $a$ and the automatic exposure adjusting circuit $b$. L is a photographic lens and X is an optical axis thereof.

According to the above construction, when photographing, by pushing down release button 20 in the direction of A as shown in FIG. 1, motor circuit $a$ is closed to drive motor 1 to rotate at constant speed, with the result that shutter driving shaft 5 is rotated through gears 2 and 6, film being thereby supplied for exposure by means of film transporting element 9, exposure being made by the rotation of rotating shutter 8. At the same time, the constant speed rotation of motor 1 produces an A.C. of a constant voltage in A.C. generator 3 through gears 2 and 4, a portion of which A.C. is half-wave rectified by diode 16 to make use thereof, in the same manner as the D.C. source generally used in the prior art, to automatically adjust the exposure value by actuating photoelectric resistor 15 and galvanometer 11. The residue of the A.C. is per se introduced into galvanometer 11 through A.C. circuit $c$, which is connected (FIG. 3) in parallel with the circuit in which diode 16 is included (FIG. 2). Consequently, these D.C. and A.C. currents overlap each other and the latter imparts a vibrating torque to galvanometer 11 changing the mechanical frictional resistance in the static state to dynamic friction with the result that the friction is significantly reduced, so that galvanometer 11 is smoothly actuatable in response to light resistance which is easy to change. Further, it is to be noted that correct actuation of the galvanometer is obtained even though the actuating current is lowered in such case as where a dark object is photographed, because sufficient vibrating torque is given by the overlapped currents reducing the friction. Determination of the value of vibrating torque is easily made by suitably determining the resistance of resistor 17.

FIG. 3 shows a principal circuit when full-wave rectification system is employed. As shown in FIG. 3, motor circuit $a$ is coupled to generator circuit $d$, which is made as the primary side of transformer 21 of which the secondary side is made as the input side of rectification circuit $e$ to connect it to automatic exposure adjusting circuit $b$. A.C. circuit $c$ is directly introduced from generator circuit $d$ into galvanometer 11, resistor 17 being included in A.C. circuit $c$. With this principal circuit shown in FIG. 3, since automatic exposure adjusting circuit $b$ and generator circuit $d$ are isolated from each other by transformer 21, short circuiting between the various circuits is completely avoided.

It is needless to say that the electric motor as mentioned above can be replaced by a spring motor of constant speed rotating type.

The A.C. generator can be constructed as a unit with the prime mover, and where an electric motor is used, it effectively contributes to provide compactness.

Instead of overlapping A.C., the use of pulsating current, as shown in FIG. 4, produced from a half-wave rectifier would give a vibrating torque, however, the value of the torque decreases when the actuating current value of the automatic exposure adjusting circuit $b$ is a small value, which makes the use of the just mentioned type difficult from the practical point of view.

As above disclosed, in accordance with this invention, mechanical frictional resistance is changed to dynamic friction from static friction whereby the frictional force is sufficiently decreased to enable smooth operation of the automatic exposure adjusting device. Furthermore, there is an economic advantage in comparison with prior art structures because of the use of the A.C. generator.

What is claimed is:

1. An automatic exposure adjusting device for motion picture cameras having a shutter mechanism and film transport mechanism including a galvanometer having a moving rotatable coil, a photoelectric resistor on which incident light rays are adapted to impinge, a prime mover for driving the shutter mechanism and the film transport mechanism, and an automatic exposure adjusting circuit, in which an A.C. generator is connected to and driven by the prime mover, a portion of the output of the A.C. generator being rectified and applied to actuate the galvanometer coil, the remaining portion of the A.C. output of the generator being overlappingly applied to the galvanometer circuit to subject the galvanometer to a vibrating torque.

2. The automatic exposure adjusting device according to claim 1 in which the A.C. generator circuit is connected to the prime mover circuit, a transformer, the primary side of the transformer being connected to the generator circuit and the secondary side of the transformer being connected to the input side of a full-wave rectifier connected to the automatic exposure adjusting circuit, and a second A.C. circuit is directly connected between the first-mentioned A.C. generator and the galvanometer.

3. An automatic exposure adjusting device according to claim 1, in which said generator is a constant-speed rotating electric motor.

4. An automatic exposure adjusting device according to claim 1, in which the A.C. generator is of unitary construction with the prime mover.

5. An automatic exposure adjusting device according to claim 1, in which the A.C. portion overlapped with the direct current to the galvanometer is replaced by a pulsating current from a half-wave rectifier.

References Cited by the Examiner
UNITED STATES PATENTS
2,914,712  11/1959  Chamberlain _____ 324—155

JOHN M. HORAN, *Primary Examiner.*